United States Patent
Bansal et al.

(10) Patent No.: US 9,702,998 B2
(45) Date of Patent: Jul. 11, 2017

(54) FULL-WAVEFIELD INVERSION OF PRIMARIES AND MULTIPLES IN MARINE ENVIRONMENT

(71) Applicants: Reeshidev Bansal, Spring, TX (US); Anatoly Baumstein, Houston, TX (US); Partha S. Routh, Katy, TX (US)

(72) Inventors: Reeshidev Bansal, Spring, TX (US); Anatoly Baumstein, Houston, TX (US); Partha S. Routh, Katy, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 481 days.

(21) Appl. No.: 14/311,045

(22) Filed: Jun. 20, 2014

(65) Prior Publication Data
US 2015/0012221 A1 Jan. 8, 2015

Related U.S. Application Data

(60) Provisional application No. 61/843,622, filed on Jul. 8, 2013.

(51) Int. Cl.
*G01V 1/30* (2006.01)

(52) U.S. Cl.
CPC ...... *G01V 1/303* (2013.01); *G01V 2210/1423* (2013.01)

(58) Field of Classification Search
CPC .................................. G01V 1/303
USPC .......................................... 702/18
See application file for complete search history.

(56) References Cited

U.S. PATENT DOCUMENTS

| | | | |
|---|---|---|---|
| 3,812,457 A | 5/1974 | Weller |
| 3,864,667 A | 2/1975 | Bahjat |
| 4,159,463 A | 6/1979 | Silverman |
| 4,168,485 A | 9/1979 | Payton et al. |
| 4,545,039 A | 10/1985 | Savit |
| 4,562,540 A | 12/1985 | Devaney |

(Continued)

FOREIGN PATENT DOCUMENTS

| CA | 2 796 631 | 11/2011 |
|---|---|---|
| EP | 1 094 338 | 4/2001 |

(Continued)

OTHER PUBLICATIONS

Abt, D.L. et al. (2010), "North American lithospheric discontinuity structured imaged by Ps and Sp receiver functions", *J. Geophys. Res.*, 24 pgs.

(Continued)

*Primary Examiner* — Bryan Bui
(74) *Attorney, Agent, or Firm* — ExxonMobil Upstream Research Company

(57) ABSTRACT

Method for using the full wavefield (primaries, internal multiples and free-surface multiples) in inversion of marine seismic data, including both pressure and vertical velocity data (21), to infer a subsurface model of acoustic velocity or other physical property. The marine seismic data are separated (22) into up-going (23) and down-going (24) wavefields, and both wavefields are inverted in a joint manner, in which the final model is impacted by both wavefields. This may be achieved by inverting both wavefields simultaneously (25), or one after the other, i.e. in a cascaded approach (35→37, or 45→47), for the subsurface properties (26, 38, 48).

11 Claims, 5 Drawing Sheets

(56) References Cited

U.S. PATENT DOCUMENTS

| | | |
|---|---|---|
| 4,575,830 A | 3/1986 | Ingram et al. |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Mostow et al. |
| 5,924,049 A | 7/1999 | Beasley et al. |
| 5,999,488 A | 12/1999 | Smith |
| 5,999,489 A | 12/1999 | Lazaratos |
| 6,005,916 A | 12/1999 | Johnson et al. |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,688,381 B2 | 4/2014 | Routh et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225483 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Izumi |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |

(56) References Cited

U.S. PATENT DOCUMENTS

| | | | |
|---|---|---|---|
| 2010/0161235 A1* | 6/2010 | Ikelle | G01V 1/364 702/17 |
| 2010/0185422 A1 | 7/2010 | Hoversten | |
| 2010/0208554 A1 | 8/2010 | Chiu et al. | |
| 2010/0212909 A1 | 8/2010 | Baumstein et al. | |
| 2010/0265797 A1 | 10/2010 | Robertsson et al. | |
| 2010/0270026 A1 | 10/2010 | Lazaratos et al. | |
| 2010/0286919 A1 | 11/2010 | Lee et al. | |
| 2010/0299070 A1 | 11/2010 | Abma | |
| 2011/0000678 A1 | 1/2011 | Krebs et al. | |
| 2011/0040926 A1 | 2/2011 | Frost et al. | |
| 2011/0051553 A1 | 3/2011 | Scott et al. | |
| 2011/0090760 A1 | 4/2011 | Rickett et al. | |
| 2011/0131020 A1 | 6/2011 | Meng | |
| 2011/0134722 A1 | 6/2011 | Virgilio et al. | |
| 2011/0182141 A1 | 7/2011 | Zhamikov et al. | |
| 2011/0182144 A1 | 7/2011 | Gray | |
| 2011/0191032 A1 | 8/2011 | Moore | |
| 2011/0194379 A1 | 8/2011 | Lee et al. | |
| 2011/0222370 A1 | 9/2011 | Downton et al. | |
| 2011/0227577 A1 | 9/2011 | Zhang et al. | |
| 2011/0235464 A1 | 9/2011 | Brittan et al. | |
| 2011/0238390 A1 | 9/2011 | Krebs et al. | |
| 2011/0246140 A1 | 10/2011 | Abubakar et al. | |
| 2011/0267921 A1 | 11/2011 | Mortel et al. | |
| 2011/0267923 A1 | 11/2011 | Shin | |
| 2011/0276320 A1 | 11/2011 | Krebs et al. | |
| 2011/0288831 A1 | 11/2011 | Tan et al. | |
| 2011/0299361 A1 | 12/2011 | Shin | |
| 2011/0320180 A1 | 12/2011 | Al-Saleh | |
| 2012/0010862 A1 | 1/2012 | Costen | |
| 2012/0014215 A1 | 1/2012 | Saenger et al. | |
| 2012/0014216 A1 | 1/2012 | Saenger et al. | |
| 2012/0051176 A1 | 3/2012 | Liu | |
| 2012/0073824 A1 | 3/2012 | Routh | |
| 2012/0073825 A1 | 3/2012 | Routh | |
| 2012/0082344 A1 | 4/2012 | Donoho | |
| 2012/0143506 A1 | 6/2012 | Routh et al. | |
| 2012/0215506 A1 | 8/2012 | Rickett et al. | |
| 2012/0275264 A1 | 11/2012 | Kostov et al. | |
| 2012/0275267 A1 | 11/2012 | Neelamani et al. | |
| 2012/0290214 A1 | 11/2012 | Huo et al. | |
| 2012/0314538 A1 | 12/2012 | Washbourne et al. | |
| 2012/0316790 A1 | 12/2012 | Washbourne et al. | |
| 2012/0316844 A1 | 12/2012 | Shah et al. | |
| 2013/0081752 A1 | 4/2013 | Kurimura et al. | |
| 2013/0238246 A1 | 9/2013 | Krebs et al. | |
| 2013/0311149 A1 | 11/2013 | Tang et al. | |
| 2013/0311151 A1 | 11/2013 | Plessix | |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Akerberg, P., et al. (2008), "Simultaneous source separation by sparse radon transform," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," $70^{th}$ EAGE Conf. & Exh., 4 pgs.

Barr, F.J. et al. (1989), "Attenuation of Water-Column Reverberations Using Pressure and Velocity Detectors in a Water-Bottom Cable," $59^{th}$ Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transform," *J. Math. Phys.* 26, pp. 99-108.

Biondi, B. (1992), "Velocity estimation by beam stack," *Geophysics* 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Waveform using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full waveform inversion: 1D experiments," *Geophysics* 74(6), pp. WCC17-WCC46.

(56) References Cited

OTHER PUBLICATIONS

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," 73$^{rd}$ EAGE Conference, *Abstract*, pp. F026.

Choi, Y et al. (2012), "Application of multi-source waveform inversion to marine stream data using the global correlation norm," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J.W. et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J Int.* 153, pp. 719-734.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), *"Numerical Optimization, Chapt. 7—Large-Scale Unconstrained Optimization,"* Springer, New York, 2$^{nd}$ Edition, pp. 165-176.

Nocedal, J. et al. (2000), "Numerical Optimization—Calculating Derivatives," Chapter 8, Springer Verlag, pp. 194-199.

Ostmo, S. et al. (2002), "Finite-difference iterative migration by linearized waveform inversion in the frequency domain," SEG Int'l. Expo. & 72$^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ronen S. et al. (2005), "Imaging Downgoing waves from Ocean Bottom Stations," *SEG Expanded Abstracts*, pp. 963-967.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.

Schoenberg, M. et al. (1989), "A calculus for finely layered anisotropic media," *Geophysics* 54, pp. 581-589.

Schuster, G.T. et al. (2010), "Theory of Multisource Crosstalk Reduction by Phase-Encoded Statics," SEG Denver 2010 Ann. Meeting, pp. 3110-3114.

Sears, T.J. et al. (2008), "Elastic full waveform inversion of multi-component OBC seismic data," *Geophysical Prospecting* 56, pp. 843-862.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," 73$^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E.et al. (1982), *"Exploration Seismology"*, pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield," *Geophysics* 49, pp. 597-606.

Simard, P.Y. et al. (1990), "Vector Field Restoration by the Method of Convex Projections," *Computer Vision, Graphics and Image Processing* 52, pp. 360-385.

Sirgue, L. (2004), "Efficient waveform inversion and imaging: A strategy for selecting temporal frequencies," *Geophysics* 69, pp. 231-248.

Soubaras, R. et al. (2007), "Velocity model building by semblance maximization of modulated-shot gathers," *Geophysics* 72(5), pp. U67-U73.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

(56) References Cited

OTHER PUBLICATIONS

Symes, W.W. (2007), "Reverse time migration with optimal checkpointing," *Geophysics* 72(5), pp. P.SM213-SM221.
Symes, W.W. (2009), "Interface error analysis for numerical wave propagation," *Compu. Geosci.* 13, pp. 363-371.
Tang, Y. (2008), "Wave-equation Hessian by phase encoding," *SEG Expanded Abstracts* 27, pp. 2201-2205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Gao, H. et al. (2008), "Implementation of perfectly matched layers in an arbitrary geometrical boundary for leastic wave modeling," *Geophysics J. Int.* 174, pp. 1029-1036.
Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG 75$^{th}$ Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70$^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.

Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," 70$^{th}$ SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007), "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.
Moghaddam, P.P. et al. (2010), "Randomized full-waveform inversion: a dimenstionality-reduction approach," 80$^{th}$ SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Virieus, J. (1986), "P-SV wave propagation in heterogeneous media," *Geophysics* 51, pp. 889-901.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Tarantola, A. (1984), "Inversion of seismic reflection data in the acoustic approximation," *Geophysics* 49, pp. 1259-1266.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," Elsevier Science, p. 8.

(56) References Cited

OTHER PUBLICATIONS

Valenciano, A.A. (2008), "Imaging by Wave-Equation Inversion," A Dissertation, Stanford University, 138 pgs.

van Groenestijn, G.J.A. et al. (2009), "Estimating primaries by sparse inversion and application to near-offset reconstruction," *Geophyhsics* 74(3), pp. A23-A28.

van Manen, D.J. (2005), "Making wave by time reversal," SEG International Exposition and 75th Annual Meeting, *Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Versteeg, R. (1994), "The Marmousi experience: Velocity model determination on a synthetic complex data set," *The Leading Edge*, pp. 927-936.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," Geophysics 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wong, M. et al. (2010), "Joint least-squares inversion of up- and down-going signal for ocean bottom data sets," *SEG Expanded Abstracts* 29, pp. 2752-2756.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts*21, pp. 1360-1363.

Xie, X.-B. et al. (2006), "Wave-equation-based seismic illumination analysis," *Geophysics* 71(5), pp. S169-S177.

Yang, K. et al. (2000), "Quasi-Orthogonal Sequences for Code-Division Multiple-Access Systems," *IEEE Transactions on Information Theory* 46(3), pp. 982-993.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

U.S. Appl. No. 14/272,020, filed May 7, 2014, Wang et al.
U.S. Appl. No. 14/286,107, filed May 23, 2014, Hu et al.
U.S. Appl. No. 14/272,827, filed May 8, 2014, Baumstein et al.
U.S. Appl. No. 14/329,431, filed Jul. 11, 2014, Krohn et al.
U.S. Appl. No. 14/330,767, filed Jul. 14, 2014, Tang et al.

\* cited by examiner

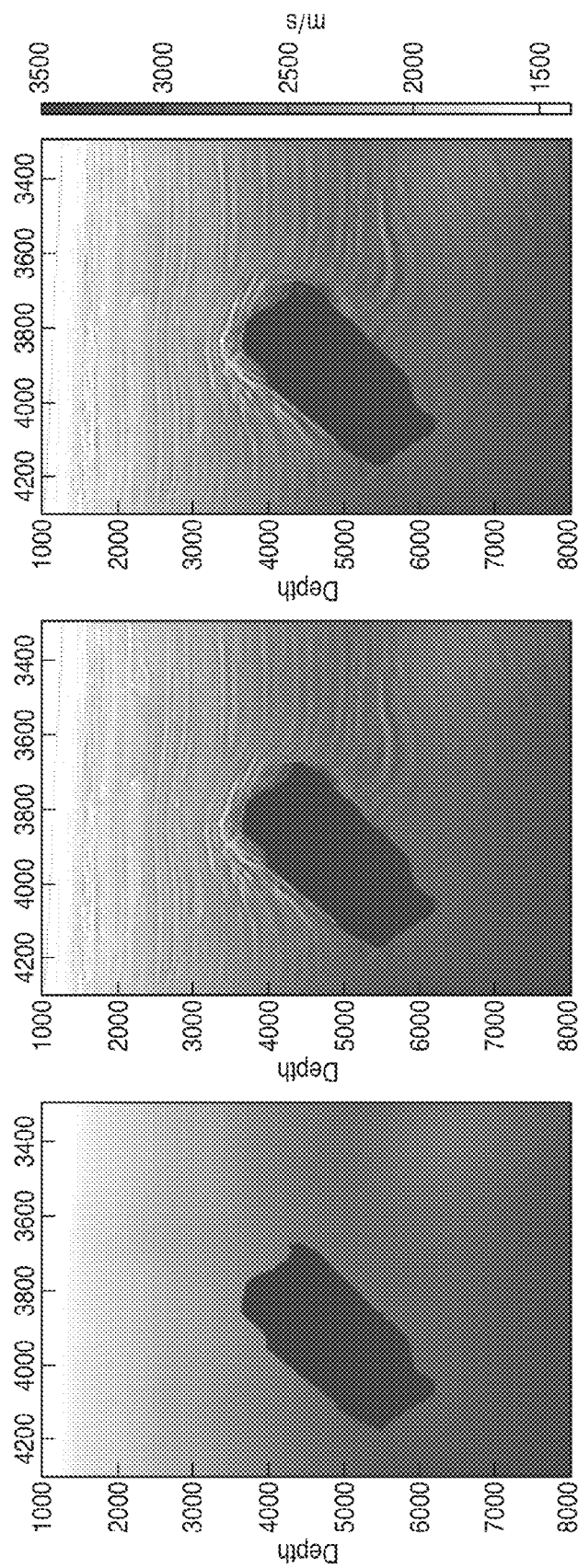

FULL-WAVEFIELD INVERSION OF PRIMARIES AND MULTIPLES IN MARINE ENVIRONMENT

CROSS-REFERENCE TO RELATED APPLICATION

This application claims the benefit of U.S. Provisional Patent Application 61/843,622, filed Jul. 8, 2013, entitled FULL-WAVEFIELD INVERSION OF PRIMARIES AND MULTIPLES IN MARINE ENVIRONMENT, the entirety of which is incorporated by reference herein.

FIELD OF THE INVENTION

The invention relates generally to the field of geophysical prospecting, and more particularly to geophysical data processing. Specifically, the invention is a method to invert seismic data containing primaries and multiples in a marine environment.

BACKGROUND OF THE INVENTION

Full wavefield inversion (FWI) is a computer-implemented geophysical method that is recently being used to invert for subsurface properties such as velocity or acoustic impedance. FWI is known to estimate the subsurface properties more accurately than, for example, inversion of the recorded wavefield after being processed to eliminate multiple reflections. The crux of any FWI algorithm can be described as follows: using a starting subsurface property model, synthetic seismic data are generated, i.e. modeled or simulated, by solving the wave equation using a numerical scheme (e.g., finite-difference, finite-element etc.). The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model. The accuracy of any FWI method is in general dictated by its two important components: the numerical algorithm used for solving wave equation to generate synthetic seismic data and the optimization scheme. Depending on the type of optimization scheme employed, a FWI method may get stuck in a local minimum while updating the subsurface model.

There are several numerical methods such as finite-difference, finite-element etc. available for solving the wave equation. The finite-difference methods [1] which are the most popular numerical scheme for solving the wave equation suffer from the interface error generated by the misalignment between numerical grids and numerical interfaces [2]. Although all types of reflection (primaries, free-surface multiples, internal multiples etc.) suffer from the interface error, the free-surface multiples are affected the most due to multiple bounces between the free surface and reflectors in subsurface. Given that free-surface multiples are some of the strongest arrivals in a seismic record, including free-surface multiples in a FWI workflow may result in erroneous inverted subsurface properties.

Although in any seismic experiment, full wavefield (primaries, internal multiples and free-surface multiples) are acquired, due to inability of accurately modeling free-surface multiples, in most of the FWI methods only primaries and internal multiples are used to invert for subsurface models. Given that the free-surface multiples carry additional information about the subsurface model and complements to the information being carried by primaries and internal multiples, it is expected that including free-surface multiples in inversion will improve the accuracy of the inverted subsurface model. The present invention is a method that permits circumventing the direct modeling and subtraction of free-surface multiples.

SUMMARY OF THE INVENTION

In one embodiment, the invention is a method for inverting marine seismic data to infer a subsurface physical property model, said seismic data including pressure data and vertical velocity data, said method comprising (a) separating the pressure data and the vertical velocity data into an up-going wavefield and a down-going wavefield; and (b) inverting the up-going wavefield and the down-going wavefield together, either simultaneously or cascaded, to infer a subsurface physical property model; wherein the separating and the inverting are performed using a computer.

In a second embodiment, the invention is a method for inverting marine seismic data to infer a subsurface physical property model, said seismic data including pressure data and vertical velocity data, said method comprising: (a) separating the pressure data and the vertical velocity data into an up-going wavefield and a down-going wavefield; and (b) iteratively inverting the up-going wavefield and the down-going wavefield together, meaning that each iteration cycle inverts the up-going wavefield or the down-going wavefield or simultaneously inverts both up-going and down-going wavefields, with each iteration cycle resulting in a model update which is used to generate simulated data in a next iteration cycle, resulting finally in a final physical property model; wherein the separating and the inverting are performed using a computer.

BRIEF DESCRIPTION OF THE DRAWINGS

The advantages of the present invention are better understood by referring to the following detailed description and the attached drawings, in which:

FIGS. 5A-5C are data displays showing test results for the present inventive method.

Figure 1:
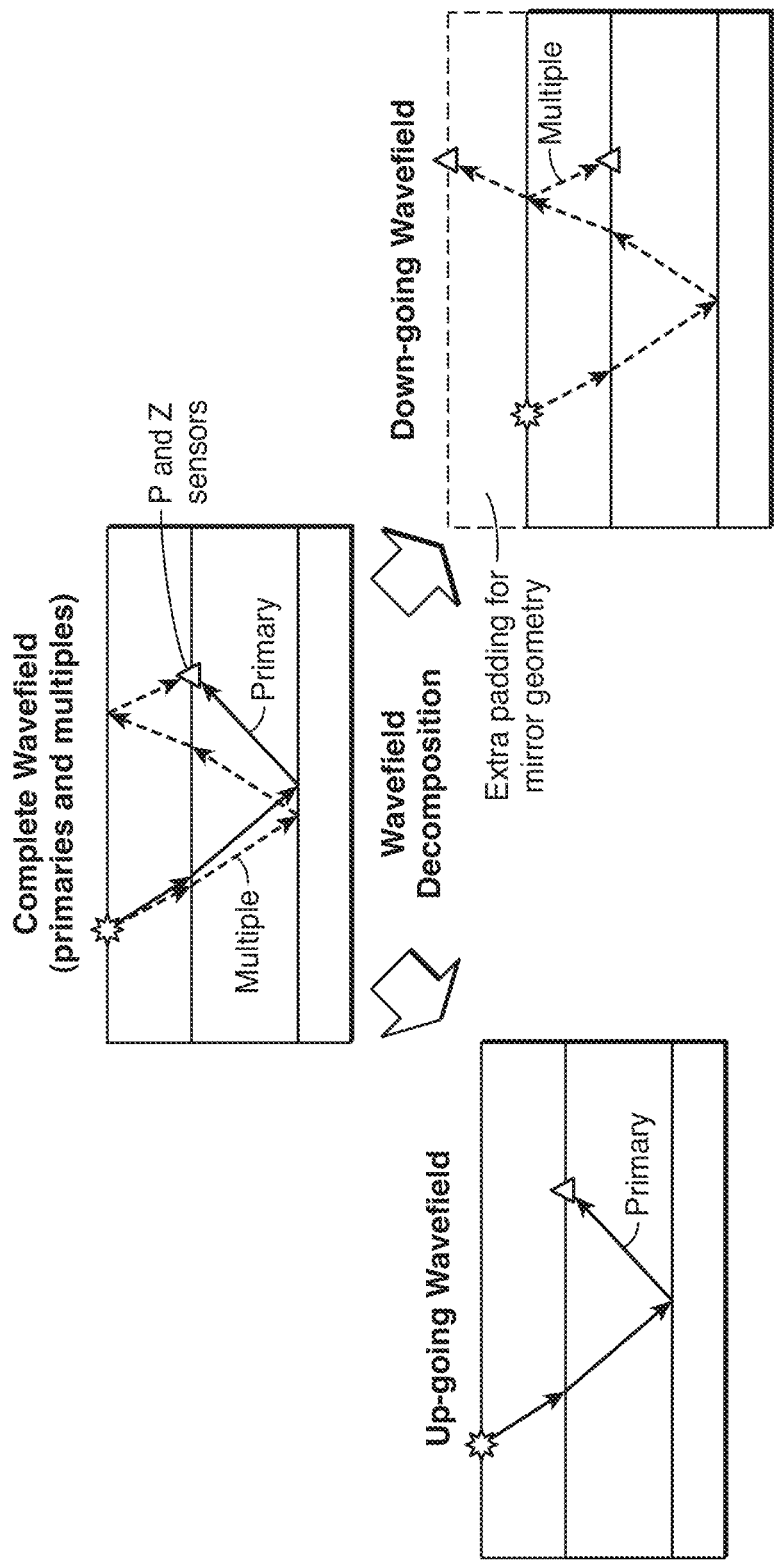
FIG. 1 illustrates decomposition of pressure and vertical particle velocity into up-going and down-going wavefields, where the up-going wavefield contains primaries and associated internal multiples and the down-going wavefield carries free-surface multiples and associated internal multiples.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The invention is a method for using the full wavefield (primaries, internal multiples and free-surface multiples) in inversion. The marine seismic data are separated into up-going and down-going wavefields, which is possible for marine surveys because of the pressure data that can be collected underwater. Then, both wavefields are inverted in some joint manner, in which the final model is impacted by both wavefields. This may be achieved by inverting both wavefields simultaneously, or one after the other (in a cascaded approach) for the subsurface properties.

Wong et al. (2010) [3] disclosed a method for performing joint least-squares migration of up- and down-going wavefields. In contrast, the present invention inverts for the subsurface properties (by implementing a method of full waveform non-linear inversion). Inversion is quite different from migration. The objective in migration, i.e. imaging, is to move the reflectors to their correct subsurface positions, assuming a velocity model of the subsurface. The velocity model is not updated in migration. Inversion is a process, usually iterative, where the objective is to improve and update the initial assumed velocity model.

The present invention is designed for marine seismic data and requires acquisition of at least two-components of wavefield namely pressure and particle velocity. Any marine seismic acquisition can be categorized into one of the following three categories: towed streamer acquisition, ocean bottom cable (OBC) acquisition and ocean bottom node (OBN) acquisition. Towed streamer acquisitions have traditionally been used to record only the pressure component of the wavefield. In the past few years, however, it has become increasingly common to record both pressure and velocity components of the wavefield using a towed streamer acquisition system. OBC and OBN acquisitions almost always record pressure and velocity components of the wavefield.

Both pressure (P) and vertical velocity components (Z) have primaries, internal multiples and free-surface multiples. In principle, pressure and velocity components can be used together in a FWI method to estimate subsurface properties. However, as mentioned previously, accurate numerical modeling of free-surface multiples is challenging. Hence, any FWI method that requires accurate modeling of seismic data is prone to error if the free-surface multiples are used in inversion. To circumvent this problem, instead of using field-recorded pressure and velocity components, the present inventive method uses up-going and down-going wavefields in inversion.

There are several published methods available for deriving up-going and down-going wavefields from pressure and vertical velocity components. Some of those are described in [4, 5]. The up-going wavefield contains primaries and associated internal multiples while the down-going wavefield contains free-surface multiples and the associated internal multiples. (The terms up-going and down-going refer to the direction of the wavefield as it arrives at the receiver.) In terms of seismic inversion, both wavefields have their own advantages and disadvantages. Reference may be had to the self-explanatory schematic diagrams of FIG. 1. The up-going wavefields have larger reflection angle and usually have better signal-to-noise ratio. Down-going wavefields provide larger aperture but have less fold than the up-going wavefield. Since the up-going wavefield does not contain free-surface multiples, free-surface multiples do not need to be modeled in order to perform FWI. The down-going wavefield, which contains the free-surface multiples, can be modeled by using mirror geometry [6, 7] without needing a free-surface condition on the top of the model. In mirror geometry, the top of the model is padded (see FIG. 1) with a water layer as thick as the water depth and the receiver location is moved upward (directly above the original location) with a distance 2 g, where g is the depth of the original receiver location.

Up-going and down-going wavefields are used to perform FWI to invert for subsurface parameters. FWI may be performed using, for example, any of the three following approaches which are all embodiments of the present inventive method. The first four steps (21-24) are the same in each approach.

Figure 2:
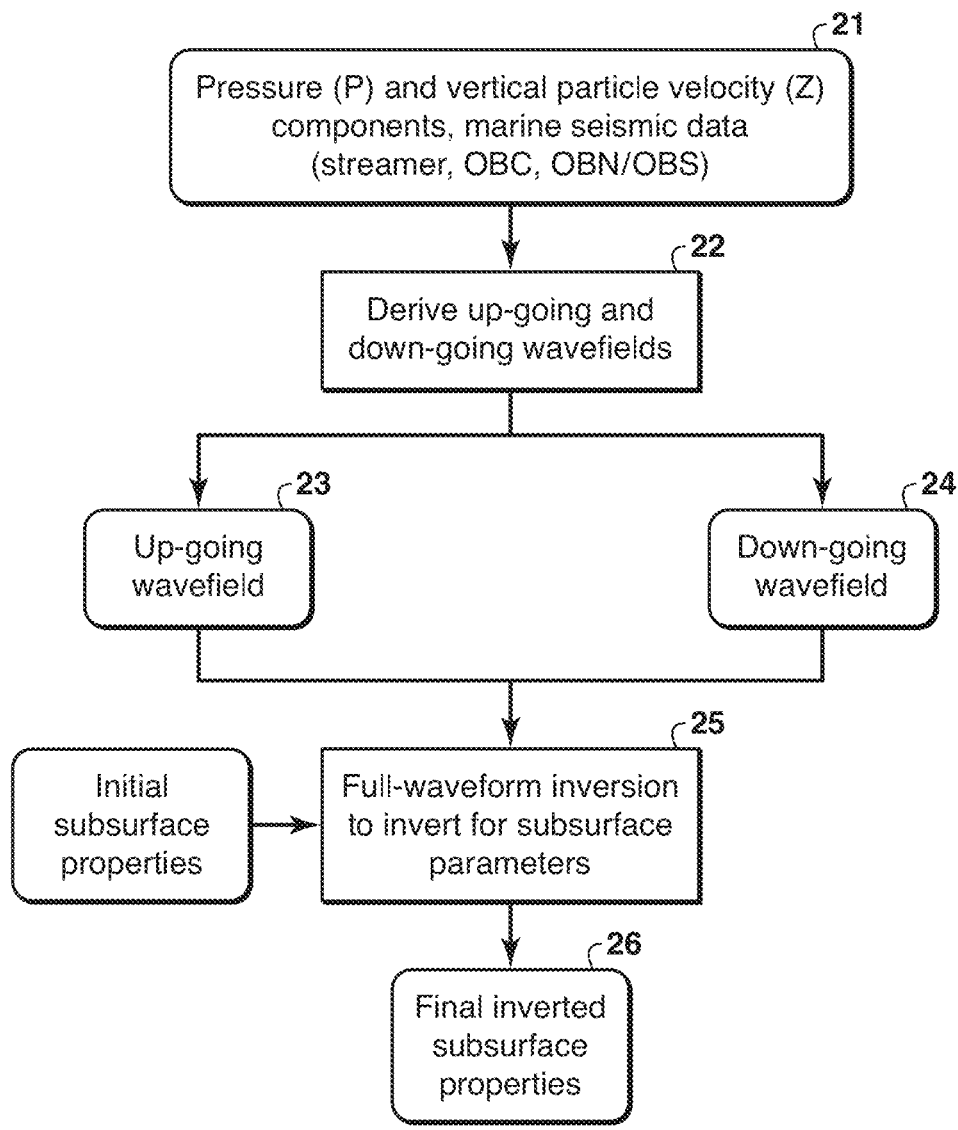
FIG. 2 is a flowchart showing basic steps in a simultaneous inversion embodiment of the present inventive method.

Simultaneous inversion: FIG. 2 describes basic steps in the workflow. Pressure and vertical velocity components of marine seismic data, including towed streamer, OBC, OBN/OBS (21), are decomposed (22) into up-going (23) and down-going (24) wavefields. These two wavefields are simultaneously inverted (25) for subsurface properties (26). A simultaneous inversion can be characterized by the optimizing of a single, combined objective function measuring misfit between simulated and actual data of both wavefields, resulting in a single model update, which updated model is then used in the next iteration cycle to simulate the up-going and down-going wavefields, etc.

Figure 3:
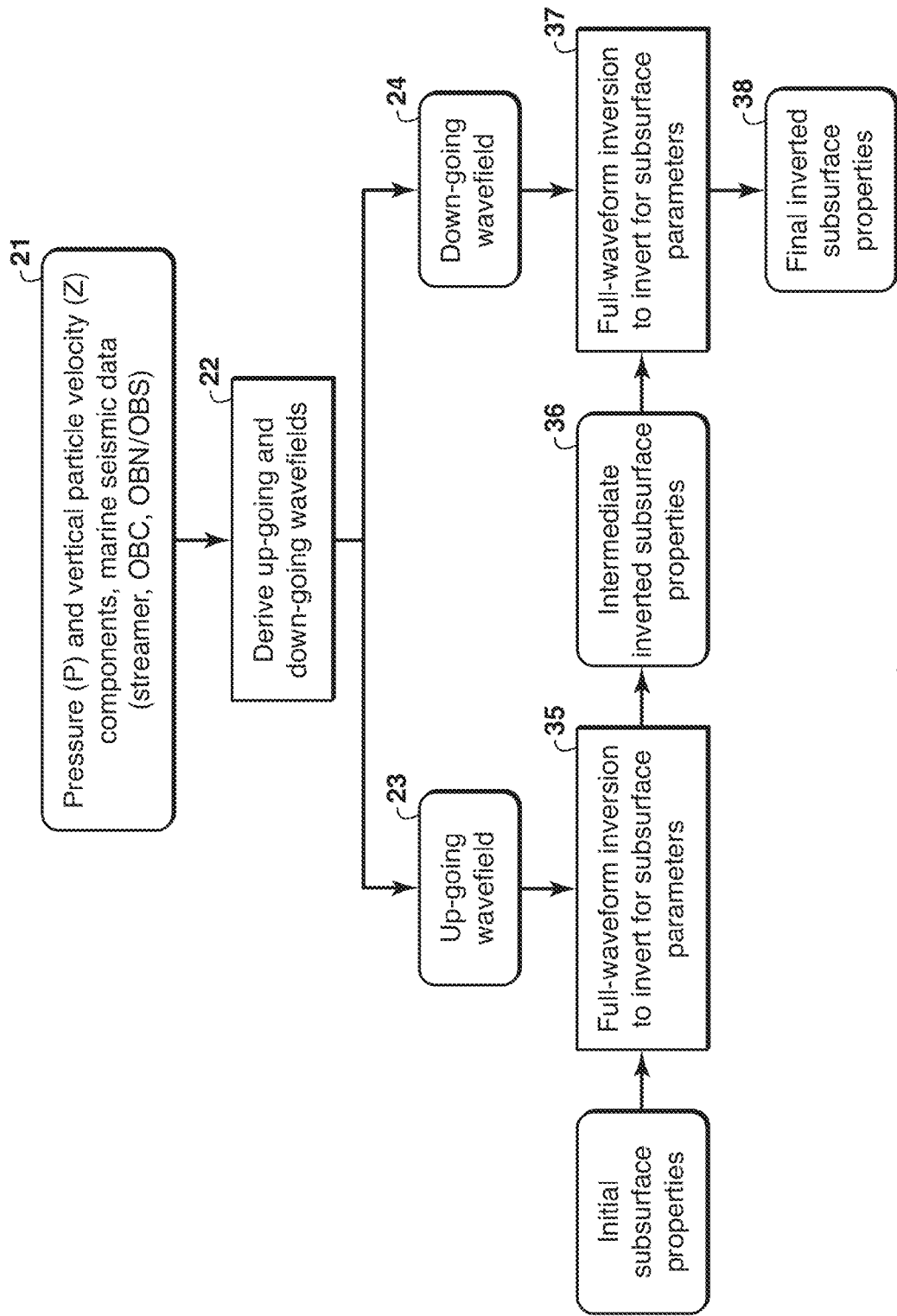
FIG. 3 is a flowchart showing basic steps in one cascaded inversion embodiment of the present inventive method.

Cascaded Inversion I: FIG. 3 describes the workflow. Pressure and vertical velocity components of marine seismic data, including towed streamer, OBC, and OBN/OBS (21), are decomposed (22) into up-going (23) and down-going (24) wavefields. Next, FWI is performed on up-going wavefield (35) to invert for subsurface properties, which may be called intermediate subsurface properties (36). Thereafter, FWI is applied on down-going wavefield (37) to invert for final subsurface properties (38) and the intermediate subsurface properties is used as the starting model for FWI.

Figure 4:
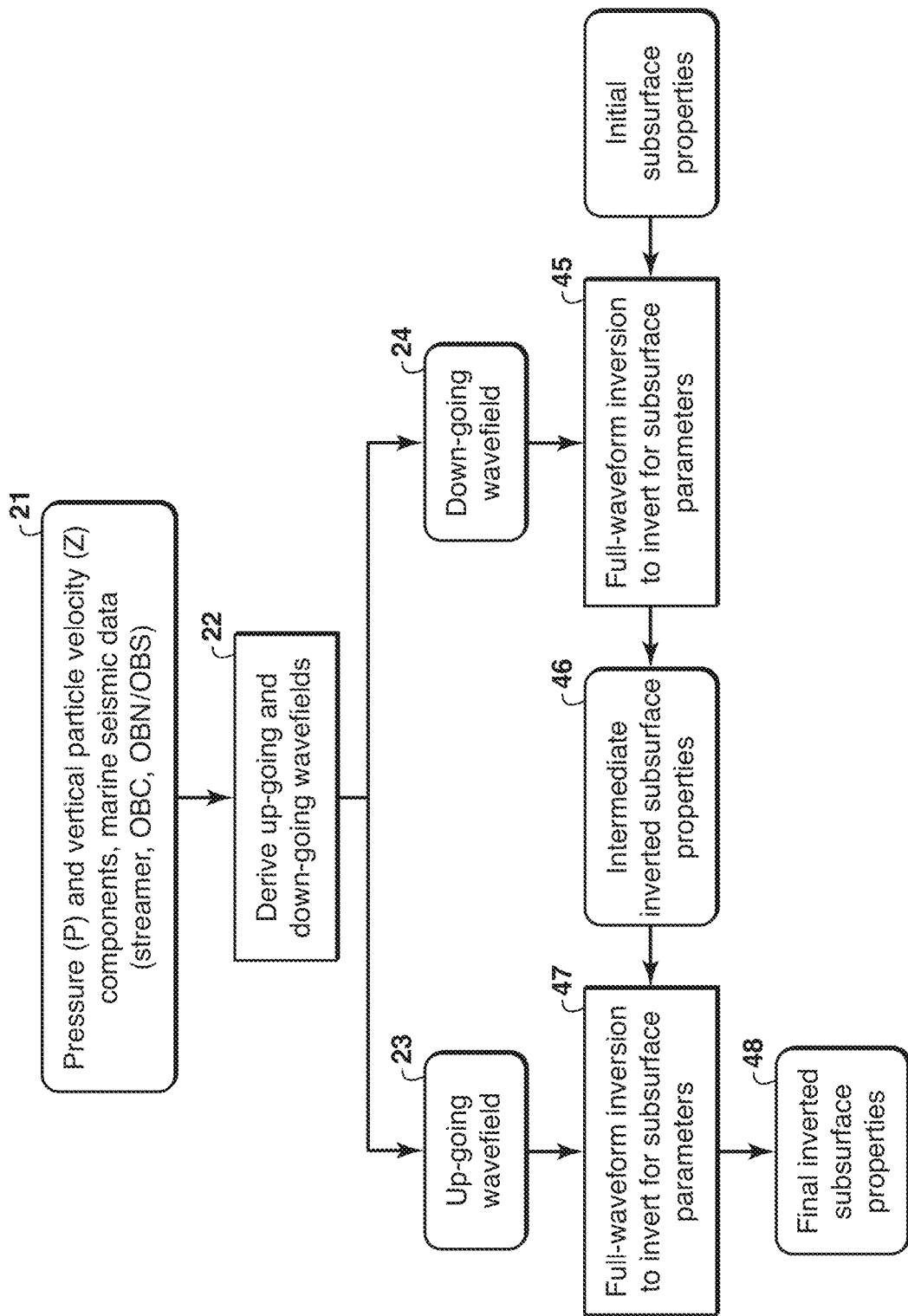
FIG. 4 is a flowchart showing basic steps in another cascaded inversion embodiment of the present inventive method.

Cascaded Inversion II: FIG. 4 describes the workflow. Pressure and vertical velocity components of marine seismic data, including towed streamer, OBC, and OBN/OBS (21), are decomposed (22) into up-going (23) and down-going (24) wavefields. Next, FWI is performed on down-going wavefield (45) to invert for subsurface properties, which may be called the intermediate subsurface properties (46). Thereafter, FWI is applied on up-going wavefield (47) to invert for final subsurface properties (48) and the intermediate subsurface properties is used as the starting model for FWI.

FIGS. 5A-5C show test results for the present inventive method applied to actual data. FIG. 5A shows the initial velocity model used to start the iterative inversion process. For complex scenarios such as the high velocity geo-body of this example, a reasonably close starting model is important to successful inversion. FIG. 5B shows the inverted velocity model using the simultaneous inversion method of FIG. 2. FIG. 5C shows the inverted velocity model using the cascaded inversion I method of FIG. 3. Both inverted models show many details not present in the starting model.

An alternative to the cascaded inversion embodiments described above might be to invert the up-going wavefield and the down-going wavefield separately, and then reduce the two resulting models to a single, best model by some sort of averaging process or least-squares fitting.

The foregoing description is directed to particular embodiments of the present invention for the purpose of illustrating it. It will be apparent, however, to one skilled in the art, that many modifications and variations to the embodiments described herein are possible. For example, an iterative inversion cycle where in the first cycle the up-going wavefield is inverted resulting in a model update, then use the updated model to invert the down-going wavefield, update the model again, then use that updated model to invert the up-going wavefield, and so on alternating the two wavefields from one cycle of the iterative process to the next. All such modifications and variations are intended to be within the scope of the present invention, as defined by the appended claims.

References

1. Virieux, J., "P-SV wave propagation in heterogenous media," *Geophysics* 51, 889-901 (1986).
2. Symes, W. W. and Vdovina, T., "Interface error analysis for numerical wave propagation," *Computational Geosciences* 13, 363-371 (2009).
3. Wong, M., Biondi, B., Ronen, S., "Joint least-squares inversion of up- and down-going signal for ocean bottom data sets," SEG Expanded Abstracts 29, 2752 (2010).
4. Barr, F. J. and Sanders, J. I., "Attenuation of water-column reverberations using pressure and velocity detectors in a water-bottom cable," 59$^{th}$ annual SEG meeting, Expanded Abstracts, 653 (1989).
5. Amundsen, L., "Elimination of free-surface related multiples with need of a source wavelet," *Geophysics* 66, 327-341 (2001).
6. Godfrey, R. P. K., Armstrong, B., Cooper, M. and Thorogood, E., "Imaging the Foinaven ghost," SEG Expanded Abstracts, 1333-1335 (1998).
7. Ronen, S., Comeaux, L. and Miao J., "Imaging downgoing waves from ocean bottom stations," SEG Expanded Abstracts, 963-966 (2005).

The invention claimed is:

1. A computer-implemented method for inverting marine seismic data to infer a subsurface physical property model, said seismic data including pressure data and vertical velocity data, said method comprising:
    separating the pressure data and the vertical velocity data into an up-going wavefield and a down-going wavefield;
    inverting, with a full wavefield inversion, the up-going wavefield and the down-going wavefield together, either simultaneously or cascaded, to infer a subsurface physical property model; and
    prospecting for hydrocarbons with the subsurface physical property model, wherein the separating and the inverting are performed using a computer.

2. The method of claim 1, wherein the inversion is cascaded, the up-going wavefield being inverted first to infer an intermediate physical property model, then, using the intermediate physical property model as an initial model, the down-going wavefield is inverted to infer a final physical property model.

3. The method of claim 1, wherein the inversion is cascaded, the down-going wavefield being inverted first to infer an intermediate physical property model, then, using the intermediate physical property model as an initial model, the up-going wavefield is inverted to infer a final physical property model.

4. The method of claim 1, wherein the physical property is velocity or acoustic impedance.

5. The method of claim 1, wherein the down-going wavefield is simulated in the inversion using mirror geometry.

6. A method of claim 1, wherein the pressure and vertical velocity data are full wavefield data, not processed to eliminate or reduce multiple reflections.

7. The method of claim 1, displaying an image of the subsurface generated from the subsurface physical property model.

8. The method of claim 1, displaying an image of the subsurface generated from the final physical property model.

9. A computer-implemented method for inverting marine seismic data to infer a subsurface physical property model, said seismic data including pressure data and vertical velocity data, said method comprising:
    separating the pressure data and the vertical velocity data into an up-going wavefield and a down-going wavefield; and
    iteratively inverting, with a full wavefield inversion, the up-going wavefield and the down-going wavefield together, meaning that each iteration cycle inverts the up-going wavefield or the down-going wavefield or simultaneously inverts both up-going and down-going wavefields, with each iteration cycle resulting in a model update which is used to generate simulated data in a next iteration cycle, resulting finally in a final physical property model,
    wherein the separating and the inverting are performed using a computer.

10. The method of claim 9, wherein each inversion comprises using a current physical property model to simulate data, comparing the simulated data to corresponding actual data, measuring a degree of misfit, and using the misfit to generate an update to the current physical property model; wherein the up-going wavefield and the down-going wavefield are separately simulated.

11. The method of claim 10, wherein the down-going wavefield is simulated using mirror geometry.

* * * * *